(12) United States Patent
Kamhi et al.

(10) Patent No.: US 10,317,900 B2
(45) Date of Patent: Jun. 11, 2019

(54) CONTROLLING AUTONOMOUS-VEHICLE FUNCTIONS AND OUTPUT BASED ON OCCUPANT POSITION AND ATTENTION

(71) Applicant: GM Global Technology Operations LLC, Detroit, MI (US)

(72) Inventors: Gila Kamhi, Zichron Yaakov (IL); Roy J. Mathieu, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 33 days.

(21) Appl. No.: 15/589,253

(22) Filed: May 8, 2017

(65) Prior Publication Data

US 2017/0329329 A1 Nov. 16, 2017

Related U.S. Application Data

(60) Provisional application No. 62/336,144, filed on May 13, 2016.

(51) Int. Cl.
*G05D 1/00* (2006.01)
*G06K 9/00* (2006.01)
(Continued)

(52) U.S. Cl.
CPC .......... *G05D 1/0061* (2013.01); *B60W 40/08* (2013.01); *B60W 50/0098* (2013.01); *B60W 50/14* (2013.01); *G05D 1/0088* (2013.01); *G06K 9/00604* (2013.01); *G06K 9/00845* (2013.01); *B60W 2040/0881* (2013.01); *B60W 2050/0075* (2013.01); *B60W 2050/146* (2013.01); *G05D 2201/0213* (2013.01)

(58) Field of Classification Search
CPC .............. G05D 1/0061; G05D 1/0088; G05D 2201/0213; B60W 40/08; B60W 50/0098; B60W 50/14; B60W 2040/0881; B60W 2050/0075; B60W 2050/146; G06K 9/00604

See application file for complete search history.

(56) References Cited

U.S. PATENT DOCUMENTS 8,676,430 B1 * 3/2014 Ferguson ............. G05D 1/0274
701/25
9,189,692 B2 11/2015 Konigsberg et al.
(Continued)

*Primary Examiner* — Nicholas Kiswanto
(74) *Attorney, Agent, or Firm* — Cantor Colburn LLP

(57) ABSTRACT

Systems for use with an autonomous vehicle. The systems in various embodiments include a non-transitory storage device comprising an autonomous-vehicle context module that, when executed by a hardware-based processing unit, determines that manual operation of the vehicle is recommended or required during autonomous operation of the vehicle. The storage device also includes an autonomous-vehicle driver module that, when executed, determines that a vehicle occupant is not ready to take manual control of the autonomous vehicle based on one or both of occupant-position data, indicating a position of the vehicle occupant, and occupant-gaze data, indicating a gaze of the vehicle occupant. The system may in response advise the user of the need to take proper position to assume manual control of the vehicle. The system may also adjust present autonomous driving, such as to slow the vehicle, or pull the vehicle over to park.

16 Claims, 4 Drawing Sheets

(51) Int. Cl.
B60W 40/08 (2012.01)
B60W 50/00 (2006.01)
B60W 50/14 (2012.01)

(56) References Cited

U.S. PATENT DOCUMENTS

| | | | | |
|---|---|---|---|---|
| 9,235,211 | B2* | 1/2016 | Davidsson | B60W 50/14 |
| 9,550,500 | B2* | 1/2017 | Hackenberg | B60W 50/082 |
| 9,740,203 | B2* | 8/2017 | Sato | B60Q 9/00 |
| 9,766,625 | B2* | 9/2017 | Boroditsky | H04L 67/306 |
| 9,971,348 | B1* | 5/2018 | Canavor | G01C 21/3617 |
| 10,023,091 | B2* | 7/2018 | Bendewald | B60N 3/001 |
| 2011/0221656 | A1* | 9/2011 | Haddick | G02B 27/017 |
| | | | | 345/8 |
| 2017/0369052 | A1* | 12/2017 | Nagy | B60W 50/08 |
| 2018/0093676 | A1* | 4/2018 | Emura | G06K 9/00288 |

* cited by examiner

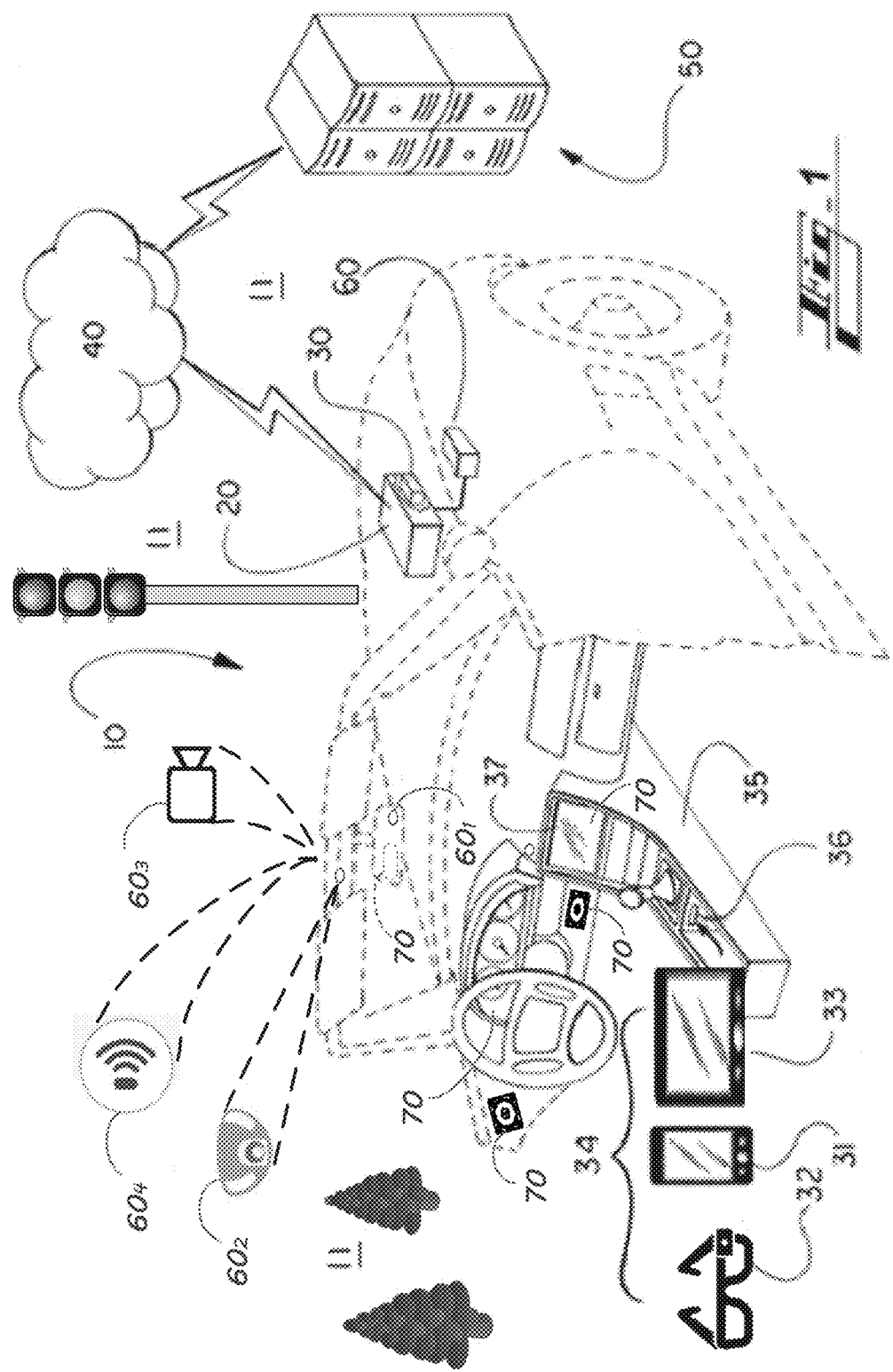

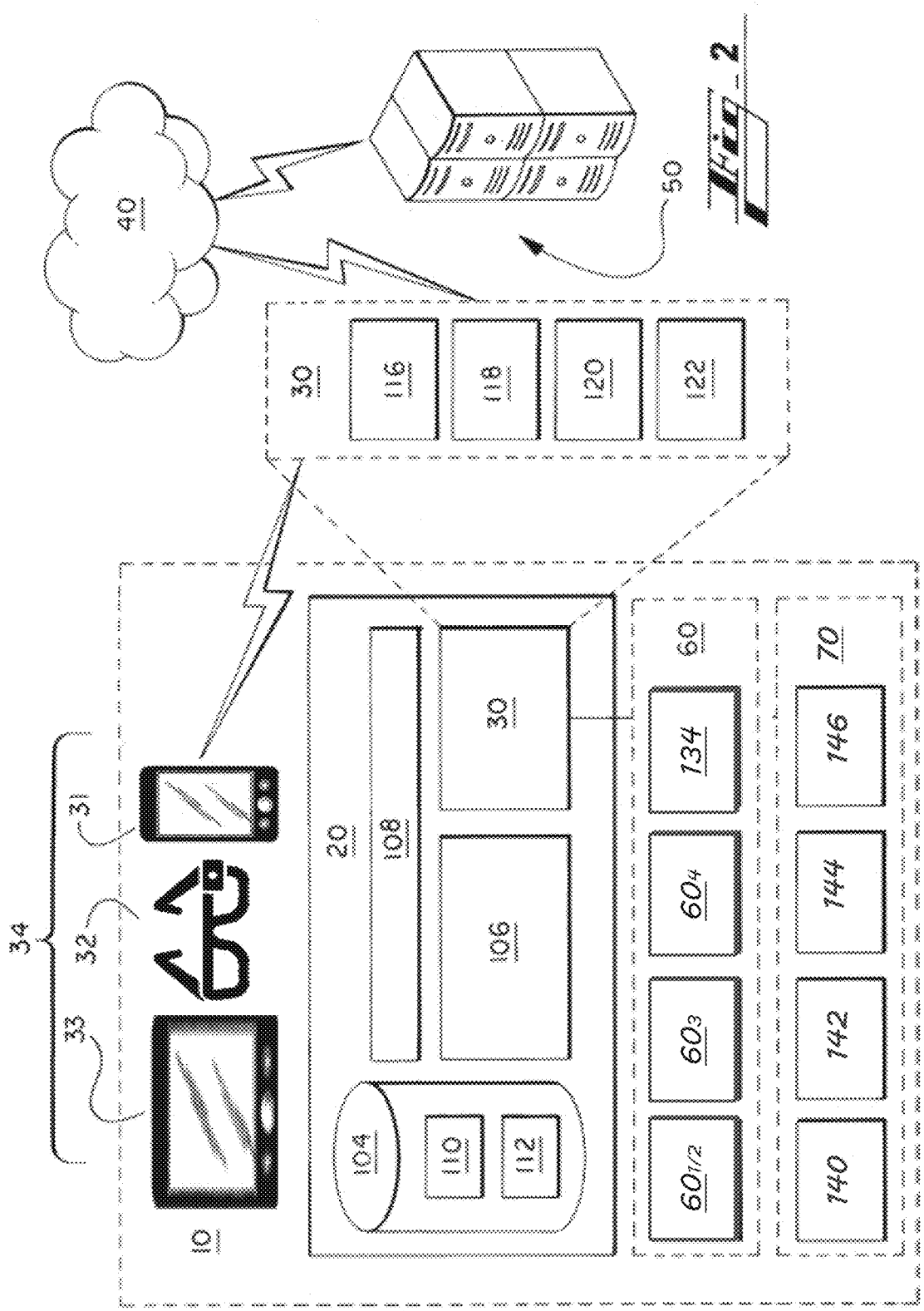

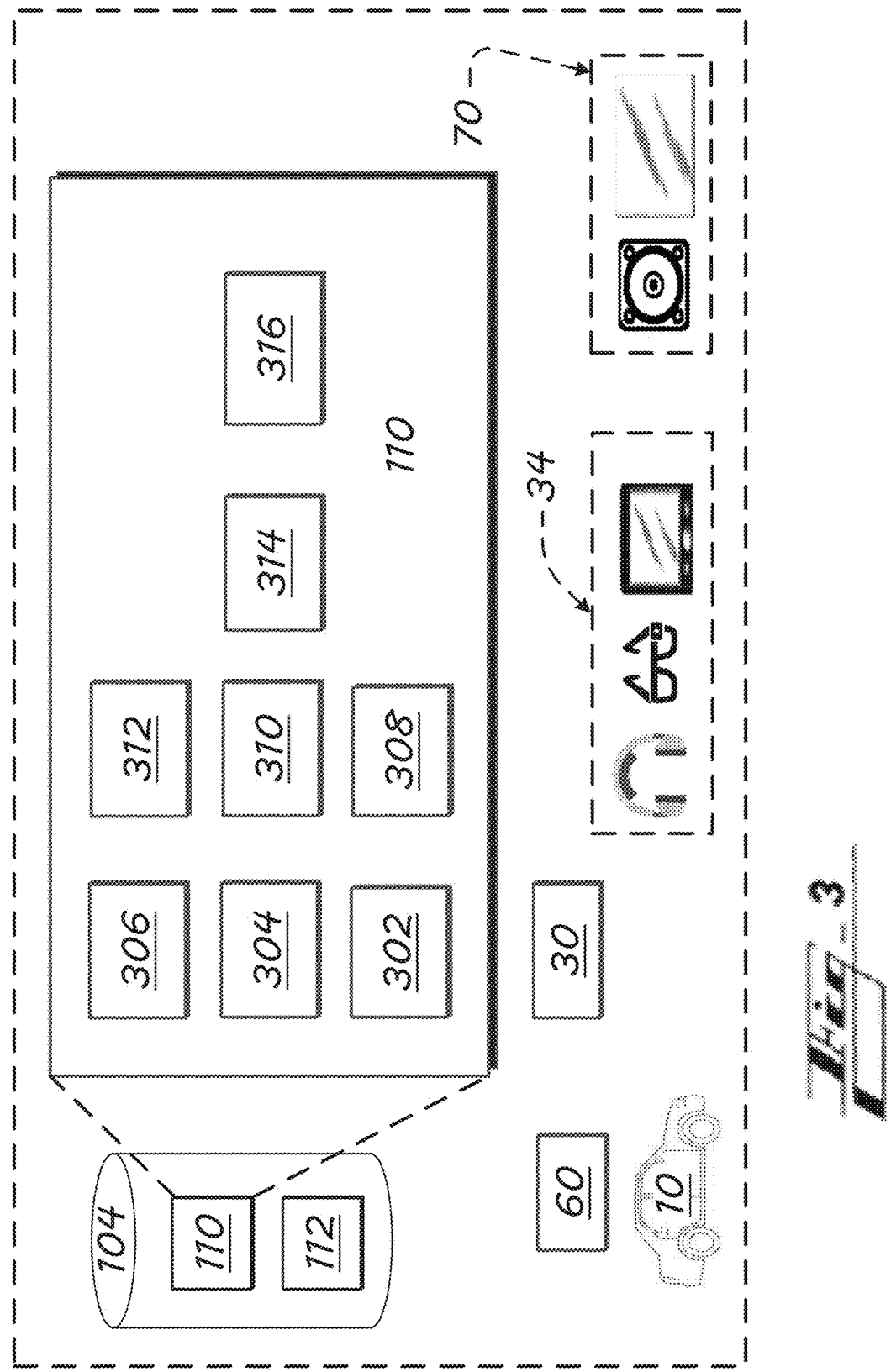

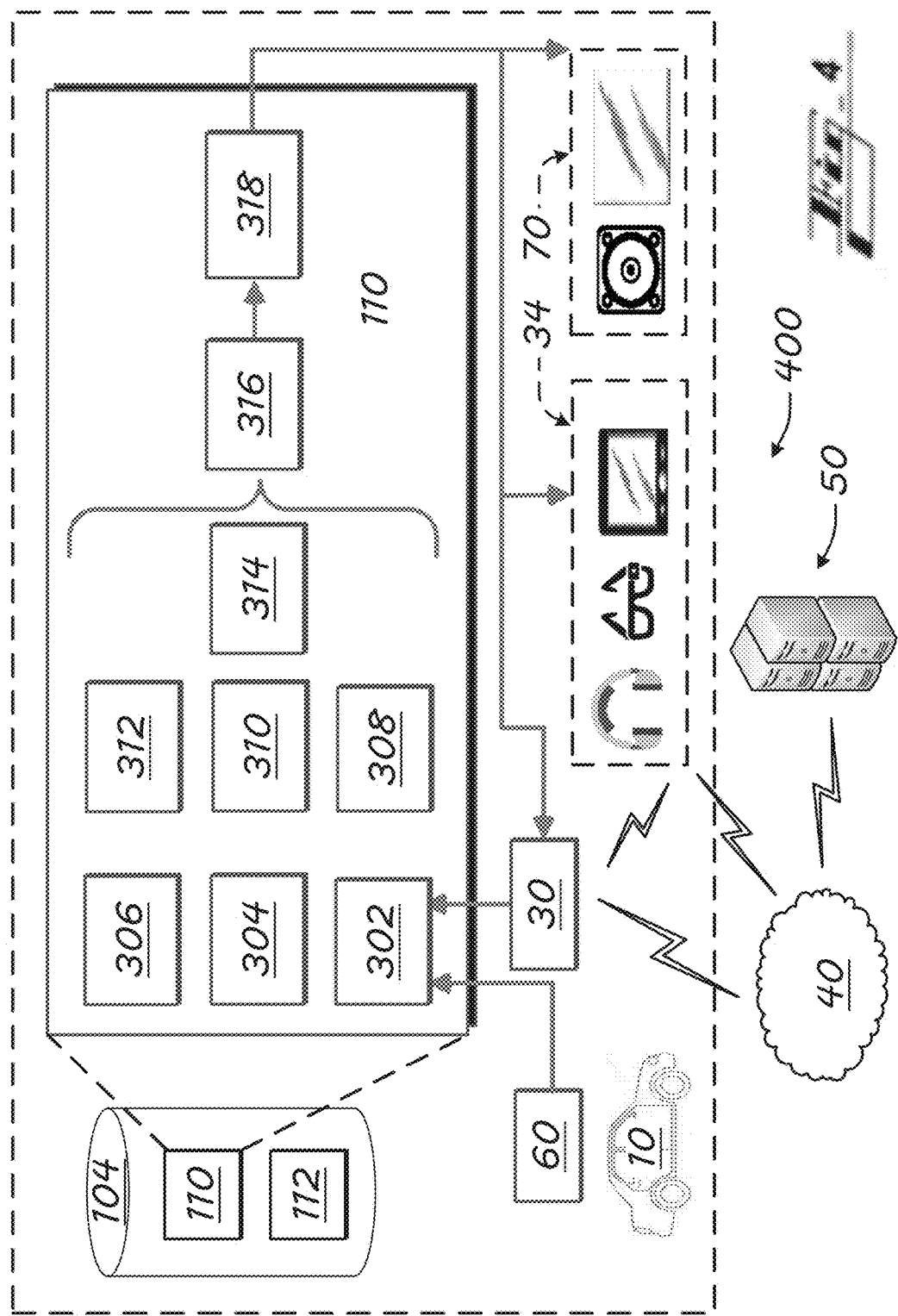

CONTROLLING AUTONOMOUS-VEHICLE FUNCTIONS AND OUTPUT BASED ON OCCUPANT POSITION AND ATTENTION

TECHNICAL FIELD

The present disclosure relates generally to systems for controlling vehicle functions and, more particularly, to systems, algorithms, and processes for controlling functions and output of vehicles, including autonomous vehicles, based on occupant position and/or occupant attention during vehicle operation.

BACKGROUND

This section provides background information related to the present disclosure which is not necessarily prior art.

Manufacturers are increasingly producing vehicles having higher levels of driving automation. Features such as adaptive cruise control and lateral positioning have become popular and are precursors to greater adoption of fully autonomous-driving-capable vehicles.

While availability of autonomous-driving-capable vehicles is on the rise, users' familiarity and comfort with autonomous-driving functions will not necessarily keep pace. User comfort with the automation is an important aspect in overall technology adoption and user experience.

Drivers or other vehicle occupants using the autonomous functionality may not be accustomed with various aspects of being a passenger or an autonomous vehicles, lowering satisfaction with the riding experience.

Drivers using autonomous functionality may also not be accustomed to taking back control of the vehicle, which may be stressful.

SUMMARY

In one aspect, the present disclosure relates to systems, for use with an autonomous vehicle, including a non-transitory storage device comprising an autonomous-vehicle context module that, when executed by a hardware-based processing unit, determines that manual operation of the vehicle is recommended or required during autonomous operation of the vehicle. The storage device also includes an autonomous-vehicle driver module that, when executed, determines that a vehicle occupant is not ready to take manual control of the autonomous vehicle based on one or both of occupant-position data, indicating a position of the vehicle occupant, and occupant-gaze data, indicating a gaze of the vehicle occupant. The system may in response advise the user of the need to take proper position to assume manual control of the vehicle. The system may also adjust present autonomous driving, such as to slow the vehicle, or pull the vehicle over to park.

In another aspect, the present disclosure relates to a process for promoting driver preparedness in an autonomous-driving vehicle of transportation. The process includes: (i) sensing, by a passenger-position sensor of the autonomous vehicle, a position of an occupant positioned in the autonomous vehicle, yielding occupant-position data; and/or (ii) sensing, by an occupant-gaze sensor of the autonomous vehicle, a gaze of the occupant, yielding occupant-gaze data.

Occupant position can include various aspects of position, such as location, pose, and orientation, of the occupant generally or any part or parts of the occupant, such as their head or face.

The process in various embodiments also includes determining, by a hardware-based processing unit executing an autonomous-driving context module, during autonomous operation of the vehicle, that manual operation of the vehicle is recommended or required.

The process further includes determining, by the hardware-based processing unit executing an autonomous-vehicle driver module, based on the occupant position data and/or the occupant-gaze data, that the occupant is not ready to take manual control of the autonomous vehicle.

The process still further includes determining, by the hardware-based processing unit, executing an activity module, an action and initiating performance of the action in response to determining that the occupant is not ready to take manual control of the autonomous vehicle.

In various embodiments, the action includes communicating with the occupant to motivate the occupant to assume position to take manual control of the autonomous vehicle.

The action may include communicating, via a human-machine interface (HMI) of the autonomous vehicle, an alert for receipt by the occupant to motivate the occupant to assume position and/or attention to take manual control of the autonomous vehicle.

The action may include adjusting autonomous-driving operation of the vehicle, such as by adjusting an autonomous driving actuator. In various embodiments, the autonomous driving actuator includes at least one actuating component selected from a group consisting of a steering component, a braking component, and a throttle component.

The act of determining that manual operation of the vehicle is recommended or required may include determining that manual operation is recommended or required for a safety reason; or determining that manual operation is recommended or required based on a pre-established setting or user preference.

In various embodiments, sensing the position of the occupant positioned in the autonomous vehicle, includes sensing respective positions of each of multiple occupants in the vehicle, yielding occupant-position data; and determining that the occupant is not ready to take manual control of the autonomous vehicle includes determining that none of the occupants are ready to take control of the vehicle.

The process in some implementations includes determining which of the occupants is in the best position to take manual control of the autonomous vehicle.

In various embodiments, the process includes determining the occupant gaze based on the occupant-gaze data and vehicle-position data, and determining that the occupant is not ready to take manual control of the autonomous vehicle is based on the occupant gaze.

While occupant gaze is determined in various embodiments using one or more vehicle sensors, in another aspect, the technology relates to a process for monitoring attention of, and interacting selectively with, an autonomous-vehicle occupant wearing smart eyewear or holding a mobile-communication device—e.g., tablet computer. The process includes receiving, from the occupant eyewear, including an occupant-gaze sensor, autonomous-vehicle gaze data indicating a gaze of the autonomous-vehicle occupant in an autonomous vehicle during autonomous driving.

The process includes determining, by a hardware-based processing unit executing autonomous-vehicle occupant, an orientation of eyes of the occupant in a reference frame, yielding autonomous-vehicle occupant orientation data.

The process also includes: determining, by the hardware-based processing unit executing an activity module, based on the autonomous-vehicle gaze data and autonomous-vehicle occupant orientation data, an action; and initiating performance of the action.

In various embodiments, the action includes one or more of: (a) providing, by way of the occupant eyewear, a communication to advise the occupant of an object within view of the autonomous-vehicle occupant; (b) providing, by way of a human-machine interface (HMI) of the vehicle, a communication to advise the occupant of an object within view of the autonomous-vehicle occupant; and (c) providing a communication to advise the occupant of an object within view of the autonomous-vehicle occupant.

The object may include any of: (I) an occupant destination indicated by an occupant itinerary; and (II) an advertisement external to the vehicle. In one embodiment, the process includes initiating, in response to determining that the occupant is viewing the advertisement, an advertising sub-process by which a credit is applied to a corresponding account.

The process in various implementations includes determining, by the hardware-based processing unit executing an activity module, based on the autonomous-vehicle gaze data and autonomous-vehicle occupant orientation data, that the occupant looked at an advertisement. The action may again include initiating an advertising sub-process by which a credit is applied corresponding to the occupant viewing the advertisement.

The disclosure also includes systems including any of the described components—e.g., hardware-based processing device, modules, etc.—for performing any of the operations described above.

And the disclosure includes computer-readable storage devices configured—e.g., customized modules, for execution by a hardware-based processing unit—to perform any of the operations described above.

Other aspects of the present technology will be in part apparent and in part pointed out hereinafter.

DESCRIPTION OF THE DRAWINGS

FIG. 1 illustrates schematically an example vehicle of transportation, with local and remote personal computing devices, according to embodiments of the present technology.

FIG. 2 illustrates schematically more details of the example vehicle computer of FIG. 1 in communication with the local and remote computing devices.

FIG. 3 shows another view of the vehicle, emphasizing example memory components.

FIG. 4 shows interactions between the various components of FIG. 3, including with external systems.

The figures are not necessarily to scale and some features may be exaggerated or minimized, such as to show details of particular components.

The figures show exemplary embodiments, and so the technology is not limited to the examples shown.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. TECHNOLOGY INTRODUCTION

The present disclosure describes, by various embodiments, systems for controlling vehicle functions and, more particularly, to systems, algorithms, and processes for controlling functions and output of autonomous vehicles based on occupant position and/or occupant attention during autonomous driving.

Functions can include providing communications to the occupant, such as an alert or message advising the occupant that they should, or need to, take control of the vehicle. Another example communication advises the occupant that the vehicle is transitioning from autonomous driving to manual driving.

Another example function is drawing a gaze of the occupant to a target object. Determining that the gaze was elsewhere is performed by one or more vehicle sensors, or using an occupant device, such as smart eyewear or a mobile communication device such as a tablet or phone.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, the like, and other.

While select examples of the present technology describe autonomous vehicles, the technology is not limited to use in autonomous vehicles (fully or partially autonomous), or to times in which an autonomous-capable vehicle is being driven autonomously. References herein to characteristics of an occupant, and communications provided for receipt by an occupant, for instance, should be considered to disclose analogous implementations regarding vehicle driver during manual vehicle operation. During fully autonomous driving, the 'driver' is considered an occupant or passenger, and the terms occupant and passenger may be used interchangeably at times herein, unless a distinction is recited, in the claims or otherwise.

II. HOST VEHICLE—FIG. 1

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34 and/or external networks 40.

By the external networks 40, such as the Internet, a local-area, cellular, or satellite network, vehicle-to-vehicle, pedestrian-to-vehicle or other infrastructure communications, etc., the vehicle 10 can reach mobile or local systems 34 or remote systems 50, such as remote servers.

Example mobile or local devices 34 include a passenger smartphone 31, a passenger wearable device 32, and a tablet computer 33, and are not limited to these examples. Example wearables 32 include smartwatches, eyewear, as shown, and smart-jewelry, such as earrings, necklaces, lanyards, etc.

Another example mobile or local device is an on-board device (OBD), such as a wheel sensor, a brake sensor, an accelerometer, a rotor-wear sensor, throttle-position sensor, steering-angle sensor, revolutions-per-minute (RPM) indicator, brake-force sensors, other vehicle state or dynamics-related sensor for the vehicle, with which the vehicle is retrofitted with after manufacture. The OBD(s) can include or be a part of the sensor sub-system referenced below by numeral 60.

The sensors 60 include intra-vehicle-focused sensors $60_1$, $60_2$, such as microphones and cameras configured to sense presence of people, activities or people, or other cabin activity or characteristics. This subset of sensors are described more below.

The vehicle controller system 20, which in contemplated embodiments includes one or more microcontrollers, can communicate with OBDs via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol.

The vehicle 10 also has various mounting structure 35. The mounting structure 35 includes a central console, a dashboard, and an instrument panel. The mounting structure 35 includes a plug-in port 36—a USB port, for instance—and a visual display 37, such as a touch-sensitive, input/output, human-machine interface (HMI).

The vehicle 10 also has a sensor sub-system 60 including sensors providing information to the controller system 20. The sensor input to the controller 20 is shown schematically at the right, under the vehicle hood, of FIG. 2. Example sensors having base numeral 60 ($60_1$, $60_2$, etc.) are also shown.

Sensor data relates to features such as vehicle operations, vehicle position, and vehicle pose, passenger characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$.

World-facing sensors $60_3$, $60_4$ sense characteristics about an environment 11 including, for instance, billboards, buildings, other vehicles, traffic signs, traffic lights, pedestrians, objects in the sensor purview, etc.

The OBDs mentioned can be considered as local devices, sensors of the sub-system 60, or both in various embodiments.

Local devices 34 (e.g., passenger phone, passenger wearable, or passenger plug-in device) can be considered as sensors 60 as well, such as in embodiments in which the vehicle 10 uses data provided by the local device based on output of a local-device sensor(s). The vehicle system can use data from a user smartphone, for instance, indicating passenger-physiological data sensed by a biometric sensor of the phone.

The vehicle 10 also includes cabin output components 70, such as sound speakers, an instruments panel. The output components may also include dash or center-stack display screen, a rear-view-mirror screen (for displaying imaging from a vehicle aft/backup camera), and any vehicle visual display device 37.

III. ON-BOARD COMPUTING ARCHITECTURE—FIG. 2

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In various embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controller system 20 described herein. The modules and functions are described further below in connection with FIGS. 3-5.

The data storage device 104 in various embodiments also includes ancillary or supporting components 112, such as additional software and/or data supporting performance of the processes of the present disclosure, such as one or more passenger profiles or a group of default and/or passenger-set preferences.

As provided, the controller system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in various embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The remote devices 50 can be configured with any suitable structure for performing the operations described herein. Example structure includes any or all structures like those described in connection with the vehicle computing device 20. A remote device 50 includes, for instance, a processing unit, a storage medium including modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A passenger computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and passengers, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 including sensors providing information to the controller system 20 regarding items such as vehicle operations, vehicle position, vehicle pose, passenger characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each, or a select, position of, (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include cabin sensors $60_1$, $60_2$ configured and arranged (e.g., positioned and fitted in the vehicle) to sense activity, people, cabin environmental conditions, or other features relating to the interior of the vehicle. Example cabin sensors $60_1$, $60_2$ include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras or sensors. As mentioned, an example thermal sensor is a thermographic camera, or thermal-imaging or infrared camera arranged in the vehicle 10 to sense thermal conditions within the vehicle and, particularly, occupant thermal conditions. In various embodiments, the thermal cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned thermal camera, or any type of camera, will likely be able to sense temperature of more of each passenger's body—e.g., torso, legs, feet.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—e.g., vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric sensor, such as a camera used for retina or other eye-feature recognition, facial recognition, or fingerprint recognition, a thermal sensors, a microphone used for voice or other user recognition, other types of user-identifying camera-based systems, a weight sensor, salinity sensor, breath-quality sensors (e.g., breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to sound speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other in output components, such as components providing an aroma or light into the cabin.

IV. ADDITIONAL VEHICLE COMPONENTS—FIG. 3

FIG. 3 shows an alternative view of the vehicle 10 of FIGS. 1 and 2 emphasizing example memory components, and showing associated devices.

As mentioned, the data storage device 104 includes one or more modules 110 for performance of the processes of the present disclosure. and the device 104 may include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

Any of the code or instructions described can be part of more than one module. And any functions described herein can be performed by execution of instructions in one or more modules, though the functions may be described primarily in connection with one module by way of primary example. Each of the modules can be referred to by any of a variety of names, such as by a term or phrase indicative of its function.

Sub-modules can cause the processing hardware-based unit 106 to perform specific operations or routines of module functions. Each sub-module can also be referred to by any of a variety of names, such as by a term or phrase indicative of its function.

Example modules 110 shown include:
an input-interface module 302;
database module 304;
autonomous-vehicle passenger-attention module 306;
autonomous-vehicle passenger-position module 308;
object-location module 310;
autonomous-vehicle driver module 312;
autonomous-driving context module 314;
activity module 316; and
output-interface module 318.

Other vehicle components shown in FIG. 3 include the vehicle communications sub-system 30 and the vehicle sensor sub-system 60. These sub-systems act at least in part as input sources to the modules 110, and particularly to the input-interface module 302. Example inputs from the communications sub-system 30 include identification signals from mobile devices, which can be used to identify or register a mobile device, and so the corresponding user, to the vehicle 10, or at least preliminarily register the device/user to be followed by a higher-level registration, such as a biometric or passcode registration.

Example inputs from the vehicle sensor sub-system 60 include and are not limited to:
bio-metric sensors providing bio-metric data regarding vehicle occupants, such as skin or body temperature for each occupant;
vehicle-occupant input devices (human-machine interfaces (HMIs), such as a touch-sensitive screen, buttons, knobs, microphone, etc.;
cabin sensors providing data about characteristics within the vehicle, such as user position, orientation, or gaze, vehicle-interior temperature, in-seat weight sensors, and motion-detection sensors;

environment sensors providing data bout conditions about a vehicle, such as from external camera and distance sensors—e.g., LiDAR, radar; and Sources separate from the vehicle 10, such as local devices 34, devices worn by pedestrians, other intra-vehicle systems such as user portable devices, local infrastructure (local beacons, cellular towers, etc.), satellite systems, and remote systems 34/50, providing any of a wide variety of information, such as user-identifying data, user-history data, user selections or user preferences, contextual data (weather, road conditions, navigation, etc.), program or system updates—remote systems can include, for instance, applications servers corresponding to application(s) operating at the vehicle 10 and any relevant user devices 34, computers of a user or supervisor (parent, work supervisor), vehicle-operator servers, customer-control center system, such as systems of the OnStar® control center mentioned, or a vehicle-operator system, such as that of a taxi company operating a fleet of which the vehicle 10 belongs, or of an operator of a ride-sharing service.

The view also shows example vehicle outputs 70, and user devices 34 that may be positioned in the vehicle 10. Outputs 70 include and are not limited to:

vehicle-dynamics actuators, such as those affecting autonomous driving—vehicle brake, throttle, steering, etc.;

vehicle climate actuators, such as those controlling HVAC system temperature, humidity, zone outputs, and fan speed(s); and local devices 34 and remote systems 34/50, to which the system may provide a wide variety of information, such as user-identifying data, user-biometric data, user-history data, contextual data (weather, road conditions, etc.), instructions or data for use in providing notifications, alerts, or messages to the user or relevant entities such as authorities, first responders, parents, an operator or owner of a subject vehicle 10, or a customer-service center system, such as of the OnStar® control center, initiating communications such as call or text/SMS to first responders, parents, operator, owner, etc.

The modules, sub-modules, and their functions are described more below.

V. ALGORITHMS AND PROCESSES—FIG. 4

V.A. Introduction to the Algorithms

FIG. 4 shows an example algorithm, represented schematically by a process flow or algorithm 400, according to embodiments of the present technology. Though a single process flow is shown for simplicity, any of the functions or operations can be performed in one or more or processes, routines, or sub-routines of one or more algorithms, by one or more devices or systems.

It should be understood that the steps, operations, or functions of the process or algorithm 400 are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes 400 can be ended at any time.

In certain embodiments, some or all operations of the processes 400 and/or substantially equivalent operations are performed by a computer processor, such as the hardware-based processing unit 106, executing computer-executable instructions stored on a non-transitory computer-readable storage device, such as any of the data storage devices 104, or of a mobile device, for instance, described above.

V.B. System Components and Functions

FIG. 4 shows the components of FIG. 3 interacting according to various exemplary process flows and algorithms 400.

The input-interface module 302, executed by a processor such as the hardware-based processing unit 106, receives any of a wide variety of input data or signals, including from the sources described in the previous section (IV.).

Inputs sources include vehicle sensors 60 and local or remote devices 34, 50 via the vehicle communication subsystem 30. Inputs also include a vehicle database, via the database module 304

Input data are passed on, after any formatting, conversion, or other processing at the input-interface module 302, to the activity module 316, or first to other modules.

The activity module 316 in various implementations requests (pull, by activity module), receives without request (push, from database module), or otherwise obtains relevant data from the database module 304. The database module 304 may include or be part of or in communication with storage portions of the vehicle 10, such as a portion storing the ancillary data mentioned. The ancillary data may, as mentioned, include one or more user profiles. The profiles can be pre-generated by the system processor, or received from a remote source such as the server 50 or a remote user computer, as examples.

The profile for each user can include user-specific preferences communicated to the system by the user, such as via a touch-screen or microphone interface.

Preferences include any settings affecting a manner by which the system interacts with the user or interacts (shares data) with a non-vehicle system such as a server or user device. Example preferences include volume, tone, or other sound preferences for media delivery, type or volume of notifications provided to the user, as just a few examples.

Data from the database module 304 can also include historic data representing past activity between the system and a user, between the system and other users, or other systems and these or other users, for instance. As just an example, if on repeated occasions, in response to a certain situation (e.g., driving over a bridge), the user reacts in a common way (gazes at the water or road below, the activity can be stored in connection with the user, and may be used in determining how or when to present information to the user, such as via a vehicle heads-up display (HUD). receiving a certain notification, a user turns down a volume in their acoustic zone, the system can generate historic or learned data for that user requiring the system to use a lower-volume for the notification.

User preferences can include, for instance, user preferences for how messages are provided—e.g., HUD vs. center-stack screen, and with or without audio, and if audio, a preferred type of audio.

Preferences can be received from a remote or non-vehicle profile, such a profile stored at a user mobile device 34 or a remote server 50, and local and remote profile features can be synchronized or shared between the vehicle 10 and the remote source.

The autonomous-vehicle passenger-attention module 306 determines a gaze of one or more passengers based on at least sensor data indicating a direction that one or both eye balls of a passenger are directed.

The determination can be based on any of a wide variety of other conditions, such as an orientation or pose of a head of the passenger, a position of the passenger in the vehicle 10, an orientation of the vehicle 10 in which the passenger is riding, a pose of the vehicle 10, and a location of the vehicle 10. The module may determine for instance that the passenger head is facing directly straight ahead from a front row passenger seat, that the passenger eyes are directed 30 degrees to the right and 10 degrees vertically above the passenger eye level.

Determining passenger attention or gaze can be performed on each of multiple passengers.

The autonomous-vehicle passenger-position module 308 can be used to determine the passenger position or pose in the vehicle. Determining passenger pose and/or position can be performed on each of multiple passengers.

The position determination can be based on one or more cabin cameras and one or more other cabin sensors, such as a temperature sensor, a short-range radar, etc.

In various embodiments, the passenger position or pose data is based instead or also on measurements of a mobile device 34, such as a tablet 33 or smart eyeglasses 32.

Mobile-device components used for the function include a front, user-facing camera, a rear, world-facing camera, range sensors, an inertial-momentum unit (IMU), having one or more accelerometers, as just a few examples. The determination can be performed on multiple passengers at generally the same time, or sequentially.

The object-location module 310 determines location of objects external to the vehicle 10. The determination is based in various embodiments on real-time, dynamic data received from one or more world-facing cameras $60_3$ and/or one or more world-facing range sensor $60_4$.

In various embodiments, the object location data can instead or also be received from a mapping or navigation database or program.

The autonomous-vehicle driver module 312 determines whether a condition exists warranting that a passenger take manual control of the vehicle. Based on the system programming, the condition may call for recommending that the passenger take control in some situations and, in other situations, ask, more assertively, that manual control be taken or, even more assertively, advise the user that the vehicle must be changed to manual mode or will pull over and park.

The autonomous-driving context module 314 generates or obtains data indicating other relevant circumstances to be used by the activity module 316 in determining a manner to act.

As an example, the context may include a passenger schedule or itinerary. The itinerary may indicate, for instance, that the user is scheduled to attend an event at a local theater and, particularly, has reserved tickets awaiting them at will call. The context data may include these facts, and a location of the will call. Or the system—e.g., context module 314—can, based on these facts, obtain the location of the will call, such as by retrieving the location from a remote server 50.

Based on the various inputs, the activity module 316 performs one or more of the man potential resulting operations described expressly and referenced or suggested otherwise herein.

In various embodiments, activity-module 316 operations include any one or more of:

- Determining a communication to provide to the passenger, including by a vehicle HUD, vehicle speakers, vehicle lights or screen, or mobile device output interface. The communication can include presenting a virtual- or augmented-reality view, such as by highlighting a pedestrian or other object sensed dynamically, in real time, by a vehicle sensor(s) that the passenger has apparently not noticed based on their gaze determined. The communication can be configured to advise the passenger that manual operation of the vehicle is recommended or required. The determination, that manual operation is recommended or required, may be based on a pre-established setting or user preference. The communication can be generated in response to determining, based on any of the mentioned vehicle and/or mobile-device sensors, that the passenger(s) does not have a position, pose, and/or eye gaze indicating that they are ready to take manual control. The communication in various implementations includes information regarding a destination indicated by the passenger or by a passenger itinerary. The module 314 may determine to present notification on a HUD highlighting location of a will-call window at a local theater that the vehicle is driving up to autonomously, so the passenger knows exactly where to go when the vehicle stops and the passenger gets out.
- Determining a manner by which to adjust vehicle autonomous driving, such as by adjusting a vehicle throttle, brakes, or steering gear.
- Determining to add credit to an advertisement account, or sent a message to a remote system (e.g., advertisement server) in response to providing a communication to the passenger to draw passenger attention to an advertising object (e.g., billboard, storefront, etc.), and detecting that the passenger in fact changed gaze to focus on the object. An advertising arrangement may include interactions with an advertising entity who pays for the advertisement views reported.
- Determining to communicate with the passenger to motivate the passenger to assume position to take manual control of the autonomous vehicle. The communication can be provided, via a human-machine interface (HMI) of the autonomous vehicle, the alert for receipt by the passenger to motivate the passenger to assume position to take manual control of the autonomous vehicle.
- Determining to deliver further advertising, for receipt by the user, or purchasing option(s), communication, in response to the passenger gazing at an advertising object (e.g., billboard or storefront), either in response to the gaze going there at all, or going in response to system prompting, or the gaze staying at the object for more than a threshold amount of time; and
- Comparing or correlating a visibility of the passenger to a gaze of the passenger, and using results of the comparison or correlation, such as in determining a manner to present augmented- or virtual-reality data via a HUD or mobile device 34, as just a few examples.

The output-interface module 318 formats, converts, or otherwise processes output of the activity module 316 prior to delivering same to the various output components for implementation.

As shown, example system output components include vehicle speakers, screens, or other vehicle outputs 70.

Example system output components can also include remote systems 50 such as remote servers and user computer systems (e.g., home computer). The output can be received and processed at these systems, such as to update a user profile with a determined preference, activity taken regarding the user, the like, or other.

For embodiments in which the passenger is wearing or has a mobile or portable device 34, such as a tablet 33 or eyewear 32, the output communication can be provided by the mobile device—e.g., highlighting a remote object in a virtual/augmented reality presentation on a mobile-device screen, and/or providing audio output (tones, synthetic voice communications, etc.). The same mobile device can thus be used as both an input source, for, e.g., passenger eye gaze determination, passenger pose or position determination, etc., and as an output destination or waypoint, such as if a user phone provide output further to another system, such as the remote server 50.

Example system output components can also include a vehicle database. Output data can be provided to the database module 304, for instance, which can be used in system learning, and be stored to an appropriate user account of the ancillary data 112.

VI. ADDITIONAL STRUCTURE, ALGORITHM FEATURES, AND OPERATIONS

In combination with any of the other embodiments described herein, or instead of any embodiments, the present technology can include any structure or perform any functions as follows.

i. The technology includes systems and methods configured in various embodiments to associate passenger attention to points of interest in the driving or commute scene (e.g., billboards, pedestrians, touristic attractions), leveraging from embedded exterior and interior sensing technology, especially, but not limited to, application in the autonomous vehicles.

ii. The technology includes systems and methods configured in various embodiments to perform automatic monitoring of points of interest or objects outside of the vehicle, in drive or commute scene, that passenger's attention is or was recently focused on, based on any of various factors such as passenger gaze, passenger pose, position, vehicle orientation, vehicle position, and object(s) position.

iii. The technology can include an advertising-based arrangement whereby credits are applied in response to user attention being on or drawn to advertising objects.

iv. The technology can be used in touring or sightseeing applications.

v. In various embodiments, if the passenger gaze is at, or perhaps very near, to an object, the system will not communicate with the user to highlight or call out the object, so as to not overwhelm the senses of the passenger.

vi. The technology may include a system that can automatically monitor which objects or points of interest (in, e.g., an environment external to cabin) get passenger/driver attention and, in various embodiments, what points or objects get attention under what circumstances—e.g., billboards noticed much more when occupant sitting in driver's seat, versus front or rear passenger seat. The system is configured to provide appropriate alerts or communications to the passenger, based on context, and in some implementations in the interest of safety.

vii. The technology leverages external advanced sensors, being provided already in many if not most autonomous vehicles, to determine dynamically, in real time, the objects of interest for the driver or occupant (e.g., where their gaze is or recently went) and also dynamically associate the passenger attention and the object in the system, such as to for subsequent uses, like awarding a user-account credit for viewing an advertisement, or determine an output action, such as to highlight the object or present information about the object, such as in an virtual-reality manner on a vehicle window, smart-glasses or other user device, hologram, etc.

viii. The technology in various embodiments uses one of three form factors, or setups, wherein the system determines any of passenger position/pose/orientation and, in some cases actively monitors the same, using one or more of:
   1. a handheld device—e.g., tablet computer or smartphone. The handheld may also be an output, as mentioned.
   2. a worn device, such as a wearable eyeglass device. The eyeglass may also be an output, as mentioned.
   3. an eye tracker embedded in the vehicle cabin, facing the user.

ix. Further regarding the tablet or other handheld form factor, most tablets have a "world-facing" (e.g., rear-facing) camera (e.g., RGB or RGB-D). Additionally, they have a user-facing (e.g., front-side) camera. The cameras may be a RGB-D camera, for instance. Other tablet sensors can be arranged at the tablet to sense in the same or other directions. In some autonomous driving systems, the systems are programmed to function according to an arrangement of various levels of automation, such as whereby autonomous driving performed at a first level includes only light automated function, such as automatic cruise control/automatic follow-distance maintenance. A higher levels, such as level 5 or 6, for instance, may involve full automation. At a medium levels of automation, such as when the vehicle is driving at a level 3, the passenger is hands free, or hands off, the steering wheel often, but not always. The hands-off ability, though, can be helpful even if occasional, as the occupant can hold and give attention to a user device such as a tablet. The vehicle would advise the user if they should take the wheel. Tablet usage may have several benefits in the context of active safety and advanced driver-assistance systems (ADAS), such as by the system providing the passenger with information (via, e.g., the tablet) that is relevant to what the passenger sees while traveling a designated route. The tablet on one hand may provide the viewpoint of the passenger using a rear facing camera, if the passenger is holding the tablet in a manner so that it is directed generally in the same direction and/or generally to the same gaze point, as the user gaze. And on the other hand, the system can annotate—e.g., highlighting or calling out by heads-up display (HUD)—relevant information aligned with the passenger viewpoint.

x. Further regarding the vehicle form factor, the system in various embodiments can create an augmented realty wide-screen HUD, and use passenger-facing frontal 3D camera, or other internal-vehicle sensor, which may be configured and arranged to be used as an eye tracker. Via sensors embedded in the vehicle, the system can detect the objects of interest in the viewpoint of the passenger. And the system can monitor the objects that the passenger sees by computing real-time gaze of the user, or a projection of the gaze to the objects in the scene.

xi. Two or three form factors can be used at once—e.g., input can include vehicle sensors and tablet sensors, and output can be provided to vehicle outputs (screen, HUD, speakers, etc.) and/or smart eyewear for display.

xii. The system can in various embodiments, depend on the sensors on the tablet facing the user, monitor passenger gaze.

xiii. Further regarding the form factor of eyewear, the system may use augmented reality functions of the eyewear. The factor is useful, for instance, to annotate a route or objects in a scene, during vehicle driving. The annotation may be done thusly in an immersive manner via the use of AR eyewear that the passenger is wearing. In case the AR eyewear has an eye tracker, the system can observe what is actually visible from the passenger viewpoint, and what he actually is seeing, which may not necessarily the same. The system can thus leverage both user-facing 3D camera for eye tracker on the tablet in addition to rear-facing camera of the tablet to annotate/render relevant virtual artifacts, or to present information to the passenger, to the viewpoint in the context/references frame/reality of the passenger. Thus, the system can leverage an existing eye-tracker source (e.g., in the smart eyewear), in addition to output of a world-facing, rear 3D camera, of wearable eyewear to render/annotate accurately relevant information to the passenger. In any event, the system can be configured to correlate what the passenger actually sees and what is visible in a passenger perspective or viewpoint, such as via synchronization with the sensors embedded in the vehicle.

xiv. Various embodiments of the technology were conceived considering that passengers (including drivers during semi- or fully autonomous driving) will observe his/her environment in a totally different manner in autonomous driving versus manual driving, as the automation will enable the passenger (including driver) to focus on activities other than driving.

xv. The system in various embodiments benefits from a determined information indicating which objects in the commute scene (external to the cabin) have, recently had, or attract passenger attention.

xvi. Further regarding active-safety uses, the system is configured to highlight objects, such as pedestrians or a ball entering the street, via augmented-reality techniques. In various embodiments, this is performed especially regarding objects that apparently do not yet have the occupants (e.g., driver's or passenger's) attention, to get occupant attention on the object.

xvii. The system is in various embodiments configured to determine not to highlight objects that already have, or apparently have attention of an occupant (e.g., a driver driving fully or partially manually). Again attention can be based on any of occupant position, user gaze, occupant pose (e.g., head pose), etc., as just a few examples. Cognitive requirement of the occupant is thus purposely limited, allowing the occupant to focus on other things.

xviii. The system can be used in sight-seeing or touring situations, such as by highlighting points of interest (POIs), such as on a HUD or user tablet, that the passengers are recommended to observe during travel, such as areas in front of, adjacent, or around the vehicle, or object in front of, adjacent, or around the vehicle (e.g., historic buildings on an autonomous-driven tour), or other local tourist attractions. If the passenger has not noticed an area or object of interest, the system may provide a timely notification, such as via text-to-speech, or visual annotation, for instance, to draw the passenger's attention to the area, object, or point of interest (POI). The system may be configured to provide information about an object, area, or POI in response to determining that the passenger was already looking at the same, or that the occupant changed gaze to the same in response to system prompting the occupant to look at it via, for instance, HUD highlighting, other AR display, voice notifications, etc.

xix. The system is in some cases configured to use a passenger tablet, smart eyewear, or other suitable user device, as an input and/or output source, as mentioned, along with or instead of one or more suitable vehicle sensors. Use of a portable device may provide the user with more flexibility or otherwise a better use experience, such as, in using a tablet or smart eyewear, the passenger having large or compete freedom to look or hold the tablet at an orientation that is not in line with the driving direction, or look or hold the tablet in any desired direction, at any time. The system in various implementations correlates a world axes or reference frame of the sensors embedded into the vehicle with a reference frame of the output, or vice versa.

xx. The system in various embodiments, such as in connection with use of a tablet and/or smart eyewear, leverages from simultaneous-localization-and-mapping (SLAM) technology. In case the system includes or uses eye tracking technology, for instance, the system can obtain accurate information regarding conditions, such as orientation of the passenger head and gaze, in a context incorporating sensed or otherwise known (from map data, for instance) objects, areas, or POIs. The SLAM technology can also help in embodiments in which the occupant is using a tablet, such as by using the SLAM technology to align, or correlate, (i) the world the tablet sees with (ii) the world as the vehicle sees it. The correlation can be used to ensure or better ensure that output provide to the user, such as AR presentation, is occupant- or human-centric.

VII. SELECT ADVANTAGES

Many of the benefits and advantages of the present technology are described above. The present section restates some of those and references some others. The benefits described are not exhaustive of the benefits of the present technology.

Safety is improved as autonomous vehicle passengers are notified by the system, that the need to get into position and/or focus their gaze for manual driving when called for.

Safety is also promoted by the dynamic, real-time communications provided to the passenger regarding objects of interest, such as a pedestrian crossing the street. This function is in some cases performed if the system determines that the passenger is not looking at the object.

The system may provide a money making interest, such as using the advertising system described.

Another side benefit of our proposed solution is that by (i) correlating a view of the passenger and what the passenger sees, and/or (ii) correlating viewports of the vehicle and a portable user device, the system ensures that output is human-centric. A way to archive this is to align the augmentation with user/passenger attention—i.e., to rendering a viewpoint of the passenger with relevant virtual artifacts aligned with passenger attention.

The technology in operation enhances driver and/or passenger satisfaction, including comfort, with using automated driving by adjusting any of a wide variety of vehicle and/or non-vehicle characteristics, such as vehicle driving-style parameters.

The technology will increase use of automated-driving system, as users are more likely to use or learn about more-advanced autonomous-driving capabilities of a vehicle when they become aware of, and especially if they use, features that facilitate and/or improve the autonomous-driving experience.

In the same vain, a 'relationship' between the user(s) and a subject vehicle can be improved—the user will consider the vehicle as more of a trusted tool, assistant, or friend. The technology thus can also affect levels of adoption and, related, affect marketing and sales of autonomous-driving-capable vehicles by increasing a user's, or potential user's, trust in autonomous-driving systems. And people are more likely to use or purchase an autonomous-driving-capable vehicle, purchase another one, or recommend, or model use of one to others under these circumstances.

Another benefit of system use is that users will not need to invest, or at least can invest less, effort in setting or calibrating some, most, or generally all automated driver style parameters, as they are set or adjusted automatically by the system, such as by in-use learning of occupant behavior, preferences, and the like. This minimizes user stress and therein increases user satisfaction and comfort with the autonomous-driving vehicle and its functionality.

VIII. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A system, for use with an autonomous vehicle, comprising:
    a non-transitory storage device comprising:
        an autonomous-vehicle context module that, when executed by a hardware-based processing unit, determines that manual operation of the autonomous vehicle is recommended or required during autonomous operation of the autonomous vehicle; and
        an autonomous-vehicle driver module that, when executed by the hardware-based processing unit, determines, based on occupant-position data received from an occupant-position sensor, that a vehicle occupant is not ready to take manual control of the autonomous vehicle, wherein the occupant-position sensor is a art of a portable occupant device.

2. The system of claim 1 wherein the non-transitory storage device comprises an activity module that, when executed by the processing unit, determines an action to be taken in response to determining that the vehicle occupant is not ready to take manual control of the autonomous vehicle.

3. The system of claim 2 wherein the action comprises providing an occupant communication configured to motivate the vehicle occupant to take a position to assume manual control of the autonomous vehicle.

4. The system of claim 3 further comprising an output module that, when executed by the processing unit, initiates delivery of the occupant communication via a human-machine interface (HMI) of the autonomous vehicle.

5. The system of claim 3 further comprising an output module that, when executed by the processing unit, initiates delivery of the occupant communication via the portable occupant device.

6. The system of claim 2 wherein the action comprises adjusting autonomous-driving operation of the autonomous vehicle.

7. The system of claim 6 further comprising an output module that, when executed by the processing unit, initiates adjusting at least one autonomous-driving component to change autonomous-driving operation of the autonomous vehicle.

8. The system of claim 1 wherein the autonomous-vehicle context module, when executed to determine that manual operation of the autonomous vehicle is recommended or required during autonomous operation of the autonomous vehicle, determines that manual operation is recommended or required for a safety reason.

9. The system of claim 1 wherein the autonomous-vehicle context module, when executed to determine that manual operation of the autonomous vehicle is recommended or required during autonomous operation of the autonomous vehicle, determines that manual operation is recommended or required based on a pre-established occupant-preference setting.

10. A system, for use with an autonomous vehicle, comprising:
    a non-transitory storage device comprising:
        an autonomous-vehicle context module that, when executed by a hardware-based processing unit, determines that manual operation of the autonomous vehicle is recommended or required during autonomous operation of the autonomous vehicle; and an autonomous-vehicle driver module that, when executed by the hardware-based processing unit, determines, based on occupant-gaze data indicating a gaze of a vehicle occupant, that the vehicle occupant is not ready to take manual control of the autonomous vehicle, wherein the occupant-gaze data is received from an occupant handheld device or an occupant wearable device.

11. The system of claim 10 comprising an output module that, when executed by the hardware-based processing unit, initiates sending environmental context data to the occupant handheld device or occupant wearable device, for use in providing a display at the occupant handheld device or the occupant wearable device.

12. The system of claim 10 wherein the autonomous-vehicle driver module, when executed by the hardware-based processing unit, determines that a vehicle occupant is not ready to take manual control of the autonomous vehicle based on the occupant-gaze data and environmental data indicating characteristics of a present vehicle-driving environment.

13. The system of claim 12 wherein the environmental data includes vehicle pose data correlating (i) vehicle position, pose, or orientation and (ii) one or more features of an environment in which the autonomous vehicle is being used.

14. A system, for use with an autonomous vehicle, comprising:
a non-transitory storage device comprising:
an autonomous-vehicle context module that, when executed by a hardware-based processing unit, determines that manual operation of the autonomous vehicle is recommended or required during autonomous operation of the autonomous vehicle; and
an autonomous-vehicle driver module that, when executed by the hardware-based processing unit, determines, based on occupant-position data received from an occupant-position sensor, a position of multiple vehicle occupants of the autonomous vehicle and that none of the multiple vehicle occupants is ready to take manual control of the autonomous vehicle.

15. The system of claim 14 wherein the occupant-position sensor is a temperature sensor.

16. The system of claim 14 wherein the occupant-position sensor is a short-range radar.

* * * * *